United States Patent
Bourbiaux et al.

(10) Patent No.: US 7,373,288 B2
(45) Date of Patent: May 13, 2008

(54) METHOD FOR MODELLING COMPOSITIONAL AND/OR MULTIPHASE TRANSFERS BETWEEN THE POROUS MATRIX AND THE FRACTURES OF A MULTILAYER POROUS MEDIUM

(75) Inventors: Bernard Bourbiaux, Rueil Malmaison (FR); Sébastien Lacroix, Paris (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 541 days.

(21) Appl. No.: 10/900,120

(22) Filed: Jul. 28, 2004

(65) Prior Publication Data

US 2005/0027499 A1   Feb. 3, 2005

(30) Foreign Application Priority Data

Jul. 29, 2003  (FR) ................................. 03 09360

(51) Int. Cl.
*G06G 7/48* (2006.01)
*G06F 7/60* (2006.01)
*G06F 17/10* (2006.01)
*G06F 19/20* (2006.01)
*G01V 1/40* (2006.01)

(52) U.S. Cl. ..................... 703/10; 703/2; 703/6; 702/6; 702/12; 702/13

(58) Field of Classification Search .................. 703/10, 703/2, 6; 702/6, 12, 13
See application file for complete search history.

(56) References Cited

U.S. PATENT DOCUMENTS 6,928,399 B1 * 8/2005 Watts et al. .................... 703/2

FOREIGN PATENT DOCUMENTS

| FR | 2 757 957 | 7/1998 |
| FR | 2 809 494 | 11/2001 |
| WO | WO 01/73476 A1 | 4/2001 |

OTHER PUBLICATIONS

Tor Barkve, Abbas Firoozabadi "Analysis of Reinfiltration in Fractured Porous Media", Society of Petroleum Engineers, SPE 24900, 1992, pp. 435-445.*

(Continued)

*Primary Examiner*—Zoila Cabrera
*Assistant Examiner*—Dwin McTaggart Craig
(74) *Attorney, Agent, or Firm*—Antonelli, Terry, Stout & Kraus, LLP.

(57) ABSTRACT

A method for simulating compositional and/or multiphase transfers between the porous matrix and the fractures of a fractured multilayer porous medium, which are respectively saturated by a distinct liquid phase and gas phase. The method comprises constructing a geologic model representative of the networks of natural fractures of the medium and converting this geologic model into an equivalent double porosity model. Diffusion of the gas phase between the fractures and the matrix is modelled considering that a gas-liquid front exhibiting a quasi-static equilibrium at the interfaces is established from an initial time and progresses at a velocity controlled by the diffusion transfers within each phase. The transfers involve the difference between the concentration within the phase and the concentration of equilibrium between the two phases, as well as a variable exchange distance expressed as a function of the matrix saturation.

16 Claims, 5 Drawing Sheets interface

OTHER PUBLICATIONS

M.J. Nicholl, R.J. Glass "Wetting Phase Permeability in a Partially Saturated Horizontal Fracture" Sandia National Laboritory, 940553-43, May 4, 1994, 33 pages.*

Sabathier et al, "*Typical Features of a Multipurpose Reservoir Simulator*," Society of Petroleum Engineers Inc., SPE, Sep. 1, 1989, pp. 475-480, USA.

Quintard et al, "*Two-Phase Flow in heterogeneous Porous Media: The Method of Large-Scale Averaging Applied to Laboratory Experiments in a Stratified System*," Society of Petroleum Engineers, Inc. SPE19682, Oct. 8-11, 1989, pp. 517-530. USA.

Sabathier et al, "*A New Approach of Fractured Reservoirs*," Society of Petroleum Engineers, Inc., SPE39825, Mar. 3-5, 1998, pp. 49-59. USA.

Gilman, J.R., "*An Efficient Finite-Difference Method for Simulating Phase Segregation in the Matrix Blocks in Double-Porosity Reservoirs*," Society of Petroleum Engineers, Inc., SPE, Jul. 1, 1986, pp. 403-416. USA.

W.H. Chen et al, *A Thermal Simulator for Naturally Fractured Reservoirs*, Paper SPE 16008 presented at the 9th SPE Symposium on Reservoir Simulation held in San Antonia, Tx, Feb. 1-4, 1987; pp. 1-5 and 174-180.

J.R. Gilman, 1986, *An Efficient Finite-Different Method for Simulating Phase Segregation in the Matrix Blocks in Double-Porosity Reservoirs*, SPE Reservoi Engineering, Jul. 1986. pp. 403-413.

H. Zazemi et al, 1976, *Numerical Simulation of Water-Oil Flow in Naturally Fractured Reservoirs*, SPE Journal, Dec. 1976, 317-326.

K. Pruess et al, 1985, *A Practical Method for Modelling Fluid and Heat Flow in Fractured Porous Media*, Society of Petroleum Engineers Journal, Feb. 1985, pp. 14-26.

M. Quintard et al, SPE 19862, Two-Phase Flow in Heterogeneous Porous Media: The Method of Large-Scale Averaging Aplied to Laboratory Experiments in a Stratified System, Society of Petroleum Engineers, pp. 517-530, published 1989.

J.C. Sabathier et al 1998. *A New Approach of Fractured Reservoirs*, Paper SPE 39825 presented at the SPE International Petroleum Conference and Exhibition of Mexico held in Villahermosa, Mexico, Mar. 3-5, 1998.

A.M. Saidi 1983. *Simulation of Naturally Fractured Reservoirs*. Paper SPE 12270 presented at the 7th SPE Symposium on Reservoir Simulation held in San Francisco, CA, Nov. 15-18, 1983. pp. 361-371.

J.E. Warren et al 1963. *The Behavior of Naturally Fractured Reservoirs*, Society of Petroleum Engineers Journal, Sep. 1963. pp. 245-255.

P. Quandalle et al, Typical Features of a Multipurpose Reservoir Simulator, SPE Reservoir Engineering, Nov. 1989, pp. 476-480.

M. Quintard et al, SPE 19862, © 1989, Two-Phase Flow in Heterogeneous Porous Media: The Method of Large-Scale Averaging Applied to Laboratory Experiments in a Stratified System, Society of Petroleum Engineers, pp. 517-530.

* cited by examiner interface

METHOD FOR MODELLING COMPOSITIONAL AND/OR MULTIPHASE TRANSFERS BETWEEN THE POROUS MATRIX AND THE FRACTURES OF A MULTILAYER POROUS MEDIUM

BACKGROUND OF THE INVENTION

1. Field of the Invention

The present invention relates to a method for simulating compositional and/or multiphase transfers between the porous matrix and the fractures of a fractured multilayer porous medium.

2. Description of the Prior Art

The prior art to which reference is made hereafter is defined and explained in the following publications:

Chen, W. H., M. L. Wasserman and R. E. Fitzmorris 1987. *A Thermal Simulator for Naturally Fractured Reservoirs*. Paper SPE 16008 presented at the 9th SPE Symposium on Reservoir Simulation held in San Antonio, Tex., Feb. 1-4, 1987;

Gilman, J. R. 1986. *An Efficient Finite-Difference Method for Simulating Phase Segregation in the Matrix Blocks in Double-Porosity Reservoirs*. SPE Reservoir Engineering, July 1986. Pages 403-413;

Kazemi, H., Merrill, L. S., Porterfield, K. L. and Zeman, P. R. 1976. *Numerical Simulation of Water-Oil Flow in Naturally Fractured Reservoirs*. SPE Journal, December 1976, 317;

Pruess, K. and T. N. Narasimhan 1985. *A Practical Method for Modelling Fluid and Heat Flow in Fractured Porous Media*. Society of Petroleum Engineers Journal, February 1985. Pages 14-26;

Quintard, M. and Whitaker, S. 1996. *Transport in Chemically and Mechanically Heterogeneous Porous Media*. Advances in Water Resources, 19(1), 29-60;

Sabathier, J. C., B. J. Bourbiaux, M. C. Cacas and S. Sarda 1998. *A New Approach of Fractured Reservoirs*. Paper SPE 39825 presented at the SPE International Petroleum Conference and Exhibition of Mexico held in Villahermosa, Mexico, 3-5 Mar. 1998;

Saïdi, A. M. 1983. *Simulation of Naturally Fractured Reservoirs*. Paper SPE 12270 presented at the 7th SPE Symposium on Reservoir Simulation held in San Francisco, Calif., Nov. 15-18, 1983; and Warren, J. E. and P. J. Root 1963. *The Behavior of Naturally Fractured Reservoirs*. Society of Petroleum Engineers Journal, September 1963. Pages 245-255.

Furthermore, various methods for simulating flows in fractured media are the subject of French patent 2,809,894 filed by the assignee and in French patent applications 02/03,436 and 03/01,090.

Reliable estimations concerning a fractured reservoir in terms of productivity and recovery require a multidisciplinary approach in order to minimize the uncertainties linked with modelling of the fracture network and simulation of the multiphase flow. In particular, the following three stages play a determinant part:

1. Construction of a model representative of natural fracture networks from available field data;
2. Conversion of this geologic model to an equivalent double porosity model; and
3. Obtaining a good estimation of the involved physical production mechanisms and reproduction thereof by means of the multiphase double porosity simulator.

The method described hereafter deals with the third stage, and more precisely with a type of formulation suited for simulation of the complex matrix-fracture transfers, that is multiphase and/or compositional and sometimes thermal transfers involved in most gas injection recovery processes. In fact, the predictions of a double porosity simulator are extremely sensitive to the formulation of the matrix-fracture transfers insofar as the major part of the oil in place is located in the matrix medium.

The double porosity conceptual model represents the fractured reservoir in a form of a set of parallelepipedic matrix blocks limited by a set of uniform orthogonal fractures (FIG. 1). Two superposed grids representing the two media, fracture and matrix, are used for flow calculation. The fracture flows are calculated between grid cells of the fracture grid, the matrix-fracture transfers are calculated for each pair of the superposed matrix and fracture cells, and the flows within the matrix are also taken into account in the double porosity option of these simulators. Warren and Root proposed the following expression for the matrix-fracture flow (per matrix volume unit) by referring to a single-phase transfer on quasi-stationary flow controlled by the pressure diffusivity:

$$f_p = \sigma K \frac{1}{\mu}(p_m - p_f) \quad (1)$$

where $p_m$ and $p_f$ are the mean matrix and fracture pressures. This equation comprises a proportionality constant $\sigma$ referred to as form factor (dimension: $1/L^2$), which reflects the geometry of the non-discretized matrix block of dimensions $(L_x, L_y, L_z)$. Kazemi proposed the following expression for $\sigma$:

$$\sigma = \frac{4}{L_x^2} + \frac{4}{L_y^2} + \frac{4}{L_z^2} \quad (2)$$

The mass transfer (mass flow per matrix volume unit) due to the molecular diffusion is expressed in a similar way:

$$f_d = \sigma D \frac{\phi}{\tau} \rho (C_m - C_f) \quad (3)$$

where D is the diffusion coefficient, $\phi$ the porosity, $\tau$ the tortuosity factor, $\rho$ the fluid density and C the concentration of the components in the fluid.

Extension of these expressions to multiphase flows leads to difficulties linked with the representation of a transient phenomenon that is difficult to reproduce without discretizing the matrix block.

This is the reason why discretization of the matrix blocks was proposed (See Saïdi, 1983) and introduced in certain simulators (See Pruess et al., (1985) or Gilman, (1986) or Chen et al., (1987)). This approach is satisfactory but it involves computation requirements that cannot be satisfied for complex or large-size reservoir models. Therefore, within the scope of the present invention, the practical situation is kept wherein the matrix blocks are not discretized and the matrix-fracture transfers are represented by a single source term expressed as a function of the matrix/fracture properties and of variables (pressures, saturations, compositions).

The difficulties increase further in the case of multiphase transfers of fluids under thermodynamic disequilibrium because the mass transfer of the components occurs at the interface between the phases and adds to the convective and diffusive transfers which take place within each phase.

To date, no double porosity simulator capable of reliably simulating multiphase compositional transfers between a matrix block filled with oil and a fracture filled with gas at disequilibrium is known, except if a convective process (gravity for example) initiates transfer of the gas to the matrix. In fact, in such situations, the gaseous components must first be dissolved in the oil phase of the matrix until the latter is entirely saturated with gas and a gas phase appears in the matrix block. It is only at this stage that the fracture-matrix single-phase molecular diffusion process can be initiated in the simulation.

SUMMARY OF THE INVENTION

The method according to the invention allows simulation of compositional and/or multiphase transfers between the porous matrix on the one hand and the fractures on the other hand of a fractured multilayer porous medium, respectively saturated by a distinct liquid phase and gas phase. It comprises constructing a geologic model representative of the natural fracture networks of the medium and converting this geologic model to an equivalent double porosity model, modelling the diffusion of the gas phase between the fractures and the matrix, considering that a gas-liquid front exhibiting a quasi-static equilibrium at the interfaces is established from an initial time and progresses at a velocity controlled by the diffusion transfers within each phase, which transfers involve the difference between the concentration within the phase and the concentration of equilibrium between the two phases, as well as a variable exchange distance expressed as a function of the matrix saturation.

The method according to the invention finds applications for example for simulation of the production of a fractured hydrocarbon reservoir in cases where multiphase transfers occur between initially oil-saturated matrix blocks and the bordering fractures swept by injected fresh gas, within the context of enhanced recovery operations.

The present invention is a method allowing compositional transfer phenomena to be simulated realistically.

BRIEF DESCRIPTION OF THE DRAWINGS

Other features and advantages of the method according to the invention will be clear from reading the description hereafter, with reference to the accompanying drawings wherein.

DETAILED DESCRIPTION OF THE INVENTION

Figure 1:
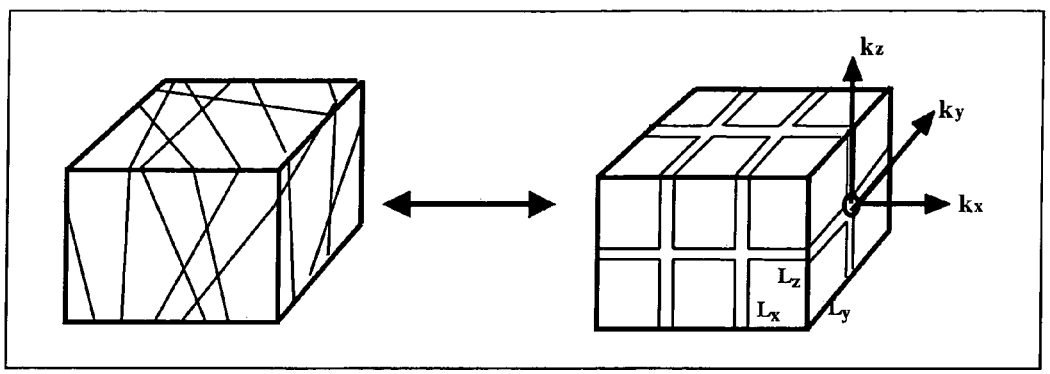
FIG. 1 is a conventional representation of a fractured medium in the double medium model according to Warren and Root, Lx, Ly, Lz representing the dimensions of the equivalent matrix block and kx, ky and kz the equivalent fracture permeabilities.
Figure 2:
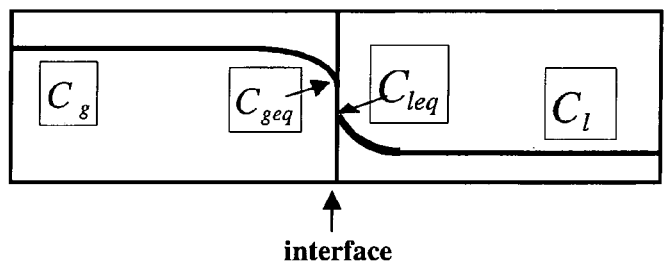
FIG. 2 shows the distribution of the compositions of a constituent in two phases with thermodynamic equilibrium at the interface (a composition gradient exists between the interface and the middle of the phase.

The formulation of the method, as well as its extension to 2D and 3D exchange conditions, and its validation in relation to reference simulations on finely gridded models is described hereafter.

Formulation of Out-of-equilibrium Oil and Gas Transfers Between a Fracture and a Non-gridded Matrix Block Underlying Principles Transfers between a fracture continuously swept by fresh injection gas and an initially oil-saturated matrix block are based on the following modelling of the physical phenomena involved:

A component transfer takes place through the interface between the oil and the gas so as to establish a local equilibrium between the two phases: this local equilibrium is obtained instantly in relation to the time required to establish a global equilibrium between the fracture and matrix fluids, by means of diffusion phenomena on block scale.

A molecular diffusion takes place within each phase as a result of the composition difference between the interface between phases and the phase taken as a whole.

Because of volumetric changes within each phase, the vapour-liquid interface progresses (swelling) or moves back (vaporization) within the matrix medium.

The simplified model of these phenomena considers that a vapor-liquid front exhibiting a quasi-static equilibrium at the interface is established from the initial time and progresses at a velocity controlled by the diffusion transfers within each phase. Such a model allows simulation of the matrix-fracture exchange flows when the fracture is entirely saturated with gas and the matrix entirely saturated with oil, provided that the formulation described in detail hereafter is used.

1D Exchange Formulation

For a liquid-saturated matrix block of lateral dimensions $L_x$, $L_y$, $L_z$, in contact with a gas-saturated fracture on 2 opposite sides (1D exchange in direction X), the expression (equation 3) of the conventional formulation of the diffusion flow for each phase (vapor or liquid) can be rewritten as follows:

$$f_d = \frac{1}{V}\frac{A}{d\tau}D\phi\rho(C_m - C_f) \qquad (4)$$

where $V=L_xL_yL_z$ (volume of the matrix block), $A=2L_yL_z$ is the exchange section for the 2 opposite sides, and $d\tau$ is the distance over which the diffusion exchange takes place (dimension d of the half block, i.e. $L_x/2$ in the present case, multiplied by the tortuosity $\tau$ taken equal to the tortuosity of the matrix $\tau_m$).

If the matrix and the fracture are saturated with different phases (oil and gas for example), the above formulation written for the vapor phase predicts no flow because the concentration $C_m$ is zero. Similarly, no diffusion flow is predicted in the liquid phase because $C_f$ is zero.

Furthermore, the exchange distance is fixed ($L_x/2$) and does not take into account the fluid dynamics described in the previous section.

The two major improvements brought to this formulation are as follows:

A. To calculate a gas diffusion flow between fracture and matrix, a fictitious concentration $C_m$ is selected as long as a vapor phase is absent in the matrix medium. This fictitious concentration is the one at equilibrium with the composition of the liquid phase of the matrix. It is obtained by equilibrium calculation between the matrix liquid phase and the fracture vapour phase. As soon as a vapor phase is present in the matrix medium, the composition of the vapor phase actually present in the matrix is re-used in the diffusion flow equation.

B. The exchange distance ($d\tau$) is no longer constant but variable so as to account for the progression of the vapor phase in the matrix block: $d\tau$ is replaced by the sum of a fixed distance representing the diffusion path within the fracture (that is half the fracture thickness, a very short distance but which is not zero at the initial time) plus the variable diffusion path within the matrix block. Assuming that the vapor phase develops in a form of a front that progresses towards the core of the block, the variable diffusion path can be expressed as a function of the vapor phase saturation $S_g$ within the matrix block. It is finally obtained, for a 1 D transfer from the 2 opposite sides of a block of length $L_x$:

$$d\square = e_f + \gamma(L_x/2)\square_m S_g \quad (5)$$

$e_f$ is half the thickness of the fracture (assuming a tortuosity equal to 1 in the fracture, but a value greater than 1 could also be introduced).

$\gamma(L_x/2)\tau S_g$ is the effective diffusion path within the matrix medium, which represents the mean diffusion length within the vapor-saturated part of the matrix medium. Assuming the displacement of a front, the vapor-saturated length is $(L_x/2).S_g$ from any one of the 2 open sides of the block, and $(L_x/2)\tau S_g$ if it is taken into account the tortuosity of the pores in the matrix. If the results obtained with the volume averaging techniques are considered (See Quintard & Whitaker), the mean diffusion length of the gas within this vapor-saturated portion of the block is $\gamma(L_x/2)\tau S_g$, $\gamma$ being a constant factor equal to 3 in the present 1D exchange case.

In accordance with these modifications, the porosity $\phi$ of equation (4) is equal to the intrinsic porosity of the fracture (generally equal to 1) as long as a vapor phase is absent in the matrix block, then to the porosity of the matrix.

Extension of the Formulation to 3D Exchanges

Now it is considered that all the sides of the matrix block are limited by fractures. Here again, a matrix block saturated with liquid and fractures filled with gas is assumed.

Concerning the fictitious concentration of the absent phase, the same procedure as that described above (§1.2, A) is applied.

The extension described below relates to the calculation of the exchange distance and section.

The generalized conventional expression for the diffusion flow is rewritten:

$$f_d = \frac{1}{L_xL_yL_z}\left(\frac{2L_yL_z}{\tau_x\frac{L_x}{2}} + \frac{2L_xL_z}{\tau_y\frac{L_y}{2}} + \frac{2L_xL_y}{\tau_z\frac{L_z}{2}}\right)D\phi\rho(C_m - C_f) \quad (6)$$

If $\tau_x$, $\tau_y$ and/or $\tau_z$ are different from one another, the following lengths can be defined to obtain an isotropic form of equation (6):

$$L'_x = L_x, \; L'_y = \sqrt{\frac{\tau_y}{\tau_x}}L_y \text{ and } L'_z = \sqrt{\frac{\tau_z}{\tau_x}}L_z$$

then:

$$f_d = \frac{1}{\tau_x L'_x L'_y L'_z}\left(\frac{2L'_yL'_z}{\frac{L'_x}{2}} + \frac{2L'_xL'_z}{\frac{L'_y}{2}} + \frac{2L'_xL'_y}{\frac{L'_z}{2}}\right)D\phi\rho(C_m - C_f) \quad (7)$$

As above, a vaporization front is considered that progresses in the block. That is the reason why, unlike formulation (6), the exchange length and section are no longer constant.

The exchange length is expressed in the form $d = e_f + \gamma\tau_i X$, with:

X: a function of the saturation of the matrix block, i: direction in which a minimum exchange distance is present in the problem made isotropic ($i = i[\text{Min}(L'_x, L'_y, L'_z) = L'_i]$), d: exchange distance ranging from an initial value equal to the thickness of the fracture, $e_f$, to a final value equal to $e_f + \gamma\tau_i\text{Min}(L'_x, L'_y, L'_z) = e_f + \gamma\tau_i$ Furthermore, for this 3D geometry, in accordance with the assumption of the existence of a front, the exchange section within the porous medium at any time t is no longer constant but equal to a mean section of flow ranging between the section of the 6 external sides of the block ($2(L'_yL'_z + L'_xL'_z + L'_xL'_y)$) and the section of flow at the front, that is:

$$f_d = \frac{1}{L'_xL'_yL'_z}\left(\frac{\overline{A}}{e_f + \gamma\tau_i X}\right)D\phi\rho(C_m - C_f) \quad (8)$$

The mean section of flow ($\overline{A}$) can be calculated from the following sum between 0 and X (harmonic mean of the local sections in the vaporized zone):

$$\frac{X}{(\overline{A})} = \int_0^X \frac{dx}{2(L'_y - 2x)(L'_z - 2x) + 2(L'_x - 2x)(L'_z - 2x) + 2(L'_x - 2x)(L'_y - 2x)} \quad (9)$$

The position of the front, X, is related to the normalized gas saturation of the matrix block, $\overline{S}_g$, as follows:

$$\overline{S}_g = 1 - \left(1 - \frac{2X}{L'_x}\right)\left(1 - \frac{2X}{L'_y}\right)\left(1 - \frac{2X}{L'_z}\right). \quad (10)$$

where $0<X<L_{min}=\text{Min}(L'_x, L'_y, L'_z)$.

In reality, reference simulations carried out on finely gridded block models show that taking account of a variable and no longer constant exchange section is not necessary and is even less representative of the real physics of the transfer for the two reasons as follows:
  (a) First, because of the polynomial dependence relation between X and $\overline{S}_g$ (Eq. 10), the mean exchange section remains very close to the section of the lateral sides as long as the gas saturation of the matrix block does not exceed 40%;
  (b) the hypothesis of a steep vaporization front progressing within the block is physically representative during the initial transfer period, but becomes less suitable as time goes by: in fact, spreading of the vaporization front with time compensates for the opposing effect of an exchange section reduction.

Thus, with 3 dimensions, using a fictitious concentration of the absent phase and selecting a variable exchange distance remain the major innovations allowing prediction of gas-oil transfers by diffusion by means of a double porosity simulator.

Validation Examples

Validation Examples

Figure 3:
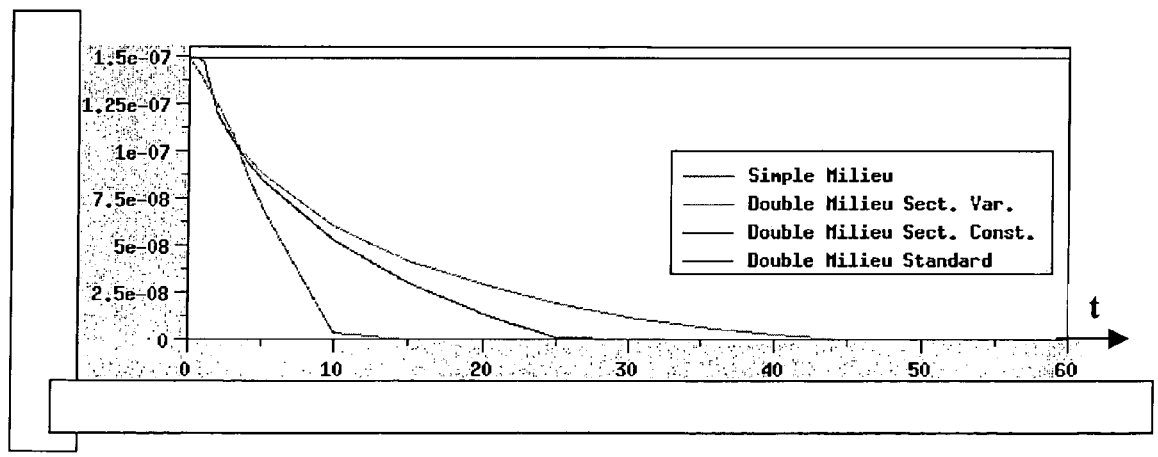
FIG. 3 shows an example of evolution with time of the total amount of oil of a binary mixture.
Figure 4:
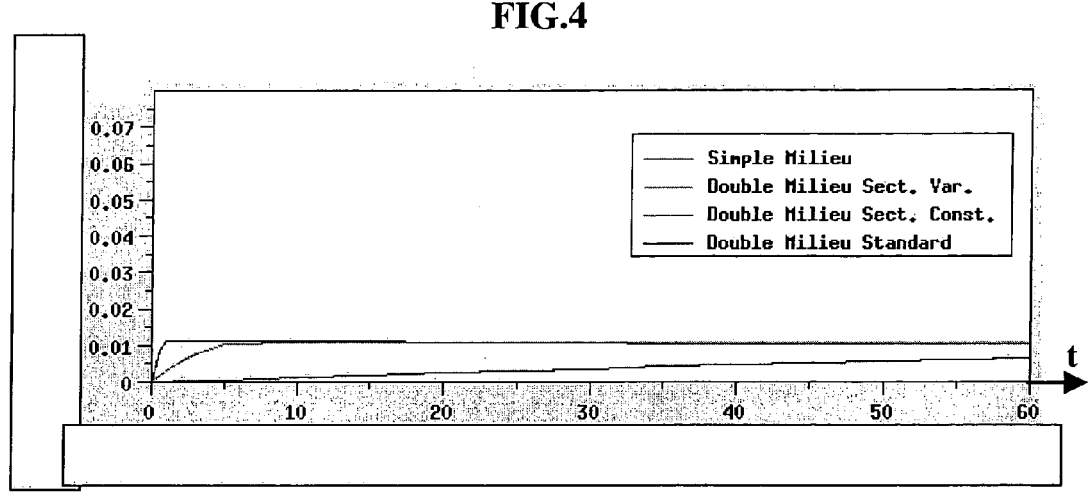
FIG. 4 shows an example of evolution with time of the total mass of C1 of a binary mixture.
Figure 5:
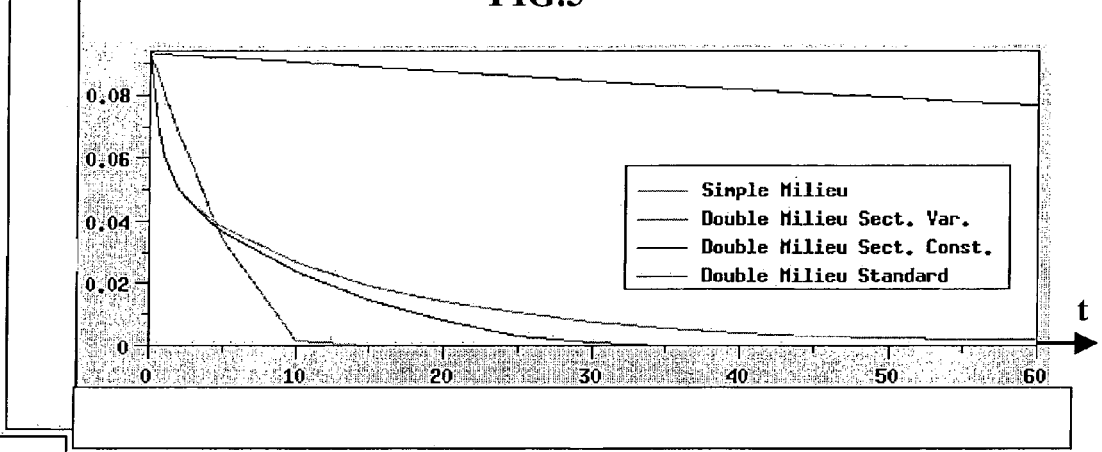
FIG. 5 shows the evolution with time of the total mass of C5 of a binary mixture.
Figure 6:
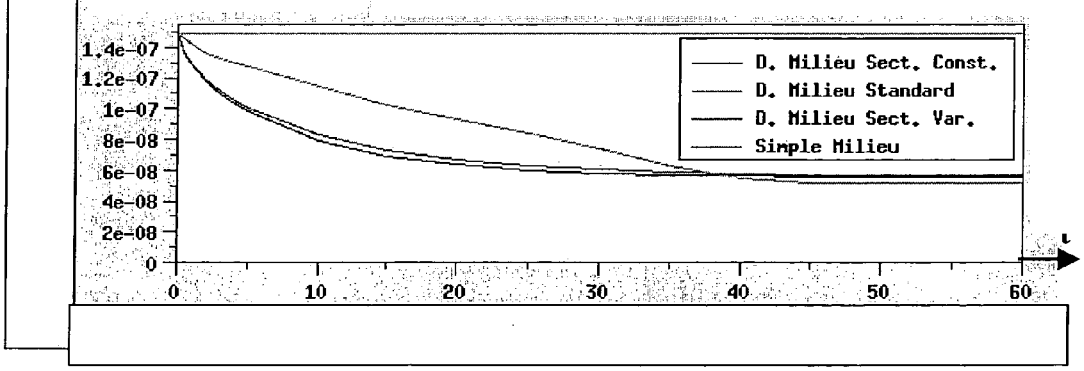
FIG. 6 shows an example of evolution with time of the total amount of oil of a ternary mixture.
Figure 7:
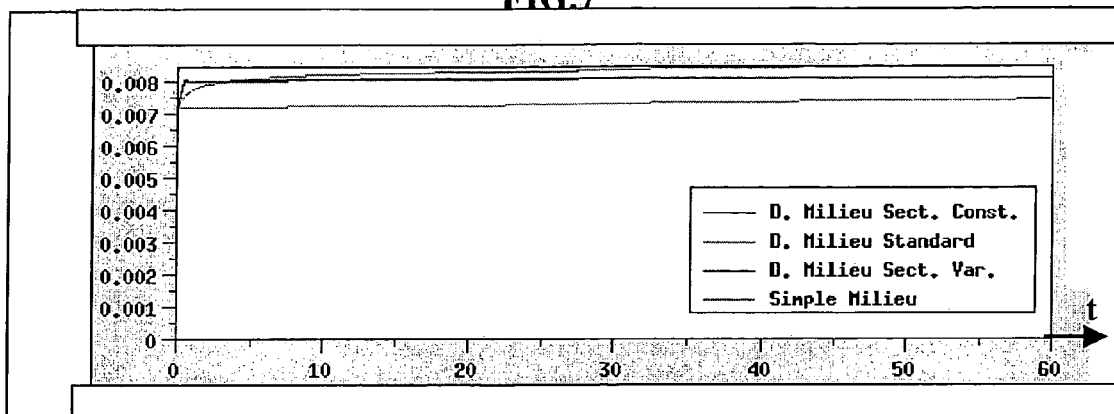
FIG. 7 shows an example of evolution with time of the total mass of C1 of a ternary mixture.
Figure 8:
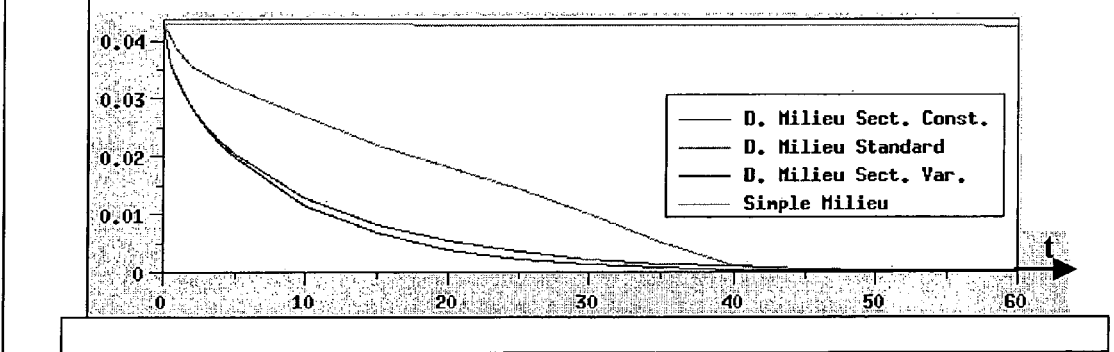
FIG. 8 shows an example of evolution with time of the total mass of C5 of a ternary mixture.
Figure 9:
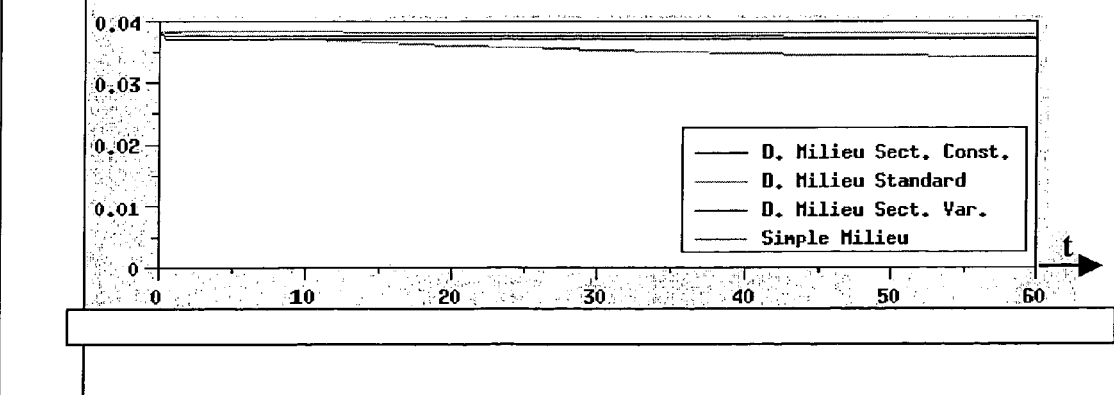
FIG. 9 shows an example of evolution with time of the total mass of C16 of a ternary mixture.
Figure 10:
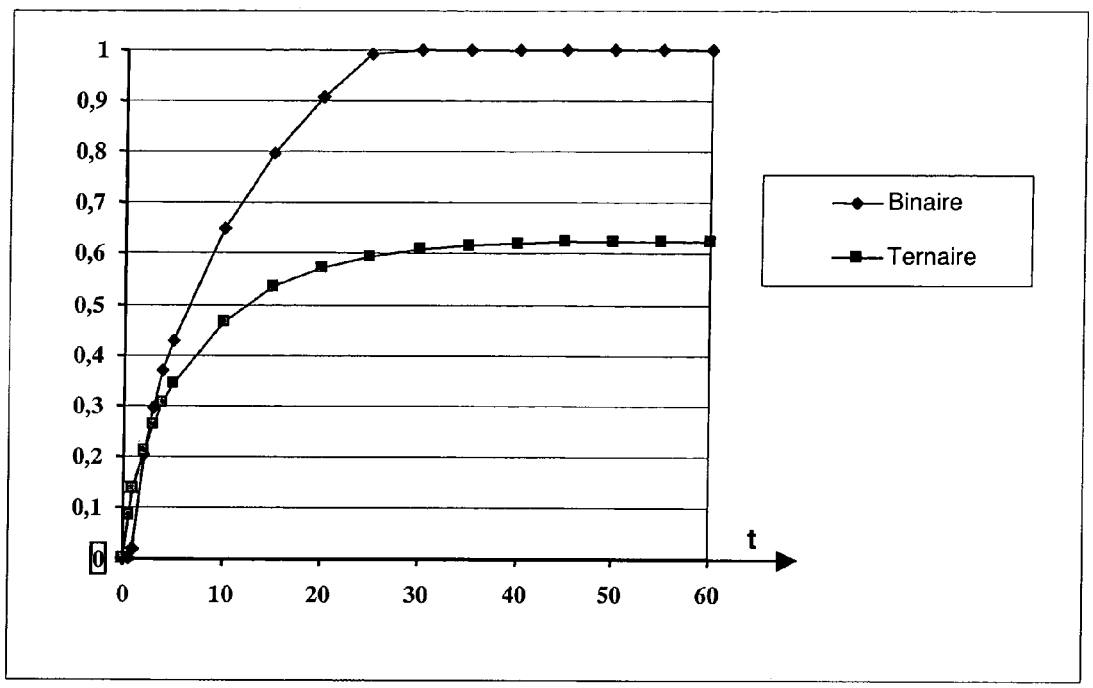
FIGS. 10 and 11 respectively show an example of gas saturation profile for the binary and ternary mixtures obtained in the course of time (FIG. 10) and an example of profile as a function of depth (FIG. 11)
Figure 11:
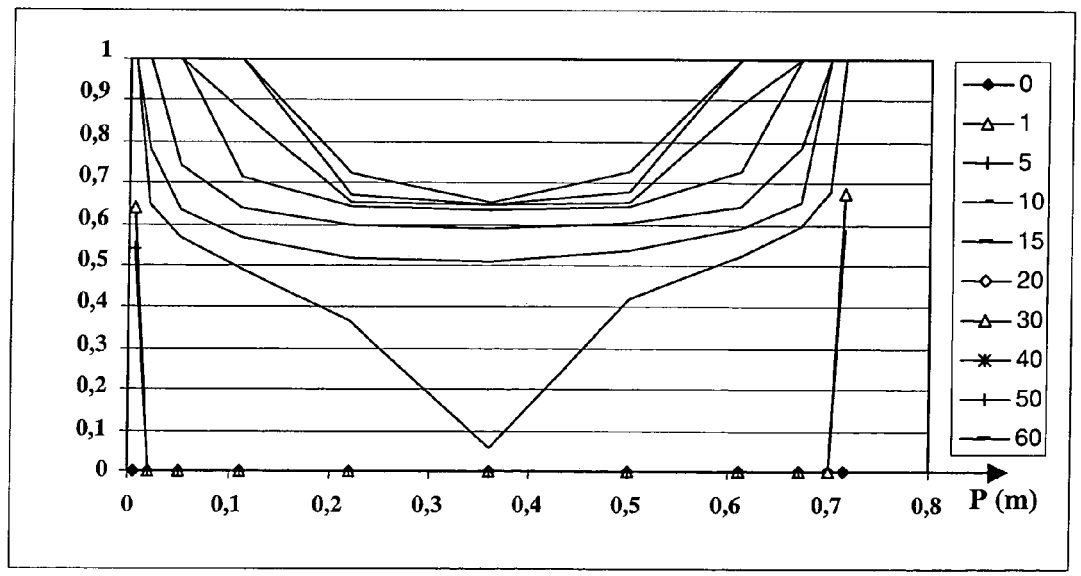
Figure 12:
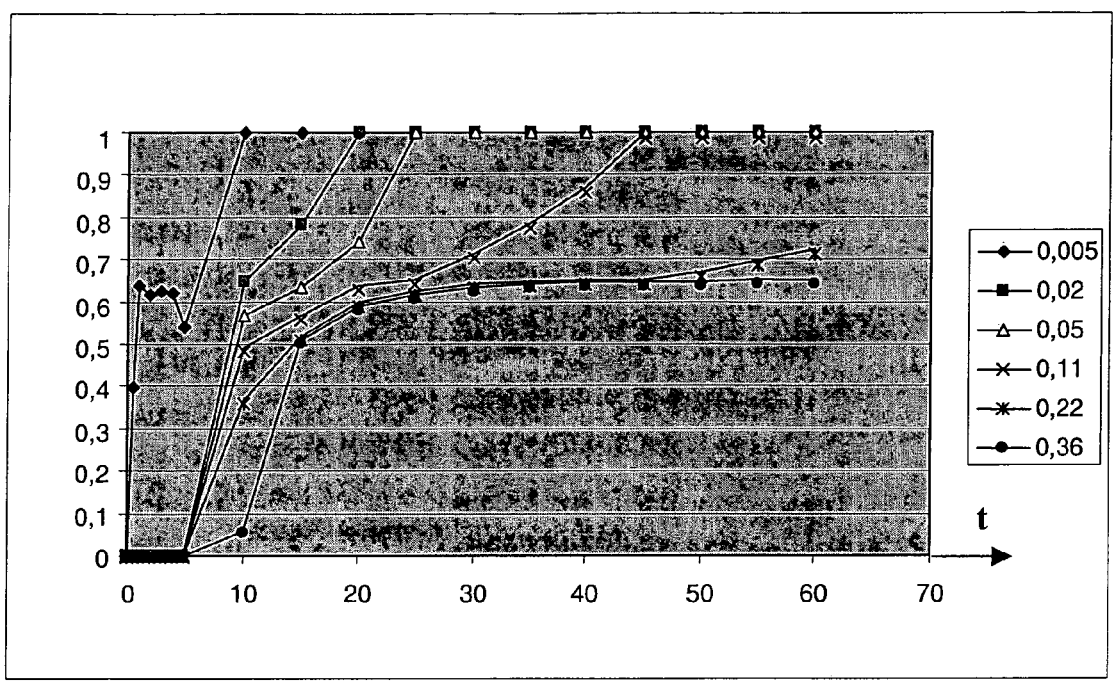
FIG. 12 shows saturation profiles at different depths in a rock sample.

FIGS. 3 to 10 illustrate comparisons between the simple medium reference formulation, the standard double medium modelling and the improved double medium modellings with constant and variable section in the case of a binary (C1 in the fracture and C5 in the matrix) and ternary mixture (C1 in the fracture and C1-C5-C16 in the matrix). It can be seen that, by means of the improved formulation, the double medium can reproduce the behavior of the simple medium unlike the standard formulation, which is totally unsuitable.

The invention claimed is:

1. A method for simulating production of a multilayer porous medium modelled by a porous matrix saturated by a liquid phase and by fractures saturated by a gas phase, by simulating at least one compositional and multiphase transfer between the porous matrix and the fractures, comprising:
  constructing a geologic model representative of natural fracture networks of the medium and converting the geologic model to an equivalent double porosity model;
  defining a model of diffusion of the gas phase between the fractures and the matrix wherein a gas-liquid front exhibiting a quasi-static equilibrium at interfaces is established from an initial time and progresses at a velocity controlled by diffusion transfers within each phase, which transfers involve a difference between concentration within each phase and a concentration of equilibrium between the phases, as well as a variable exchange distance expressed as a function of saturation of the matrix; and
  simulating production of the medium by simulating at least one of the compositional and multiphase transfers by diffusion by a double porosity simulator and the model of the diffusion.

2. A method in accordance with claim 1 wherein the equilibrium is quasi-static.

3. A method in accordance with claim 1 wherein the liquid phase and the gas phase are distinct phases.

4. A method in accordance with claim 2 wherein the liquid phase and the gas phase are distinct phases.

5. An application in accordance with claim 1 wherein multiphase transfers occur between initially oil-saturated matrix blocks and bordering fractures swept by injecting fresh gas.

6. An application in accordance with claim 2 wherein multiphase transfers occur between initially oil-saturated matrix blocks and bordering fractures swept by injecting fresh gas.

7. An application in accordance with claim 3 wherein multiphase transfers occur between initially oil-saturated matrix blocks and bordering fractures swept by injecting fresh gas.

8. An application in accordance with claim 4 wherein multiphase transfers occur between initially oil-saturated matrix blocks and bordering fractures swept by injecting fresh gas.

9. A method for providing oil recovery from a multilayer porous medium modelled by a porous matrix saturated by a liquid phase and by fractures saturated by a gas phase, by simulating at least one compositional and multiphase transfer between the porous matrix and the factures, comprising:
  constructing a geologic model representative of natural fracture networks of the medium and converting the geologic model to an equivalent double porosity model;
  defining a model of diffusion of the gas phase between the fractures and the matrix wherein a gas-liquid front exhibiting a quasi-static equilibrium at interfaces is established from an initial time and progresses at a velocity controlled by diffusion transfers within each phase, which transfers involve a difference between concentration within each phase and a concentration of equilibrium between the phases, as well as a variable exchange distance expressed as a function of saturation of the matrix;
  simulating production of the medium by simulating at least one of the compositional and multiphase transfers by diffusion by a double porosity simulator and the model of the diffusion; and
  using the simulated production in performing oil recovery.

10. A method in accordance with claim 9 wherein the equilibrium is quasi-static.

11. A method in accordance with claim 9 wherein the liquid phase and the gas phase are distinct phases.

12. A method in accordance with claim 10 wherein the liquid phase and the gas phase are distinct phases.

13. An application in accordance with claim 9 wherein multiphase transfers occur between initially oil-saturated matrix blocks and bordering fractures swept by injecting fresh gas.

14. An application in accordance with claim 10 wherein multiphase transfers occur between initially oil-saturated matrix blocks and bordering fractures swept by injecting fresh gas.

15. An application in accordance with claim 11 wherein multiphase transfers occur between initially oil-saturated matrix blocks and bordering fractures swept by injecting fresh gas.

16. An application in accordance with claim 12 wherein multiphase transfers occur between initially oil-saturated matrix blocks and bordering fractures swept by injecting fresh gas.

* * * * *